United States Patent

[11] 3,587,035

| [72] | Inventor | Edward J. Kotski<br>Pittsfield, Mass. |
| --- | --- | --- |
| [21] | Appl. No. | 856,671 |
| [22] | Filed | Sept. 10, 1969 |
| [45] | Patented | June 22, 1971 |
| [73] | Assignee | General Electric Company |

[54] GAS SHIELD FOR LOAD-BREAK CABLE TERMINATION
8 Claims, 2 Drawing Figs.

[52] U.S. Cl............................................. 339/111,
339/143
[51] Int. Cl...................................................... H01r 15/06
[50] Field of Search......................................... 339/211,
111, 61, 143; 174/73, 144.2, 140; 200/144, 149

[56] References Cited
UNITED STATES PATENTS
2,163,412 6/1939 Schneider..................... 339/143
3,243,756 3/1966 Ruete et al...... ..... 339/143 X
3,512,118 5/1970 Leonard... ...... 339/60

*Primary Examiner*—Richard E. Moore
*Attorneys*—Francis X. Doyle, Vale P. Myles, Frank L. Neuhauser, Oscar B. Waddell and Joseph B. Forman ABSTRACT: A high voltage electric cable termination module characterized by having a gas-confining flange mounted thereon adjacent an end of the module that is used to mount an exposed electrical conductor which is adapted to be engaged and disengaged with a second electrical conductor under load-break conditions. The gas-confining shield serves to prevent hot ionized gases generated by an electric arc between the two conductors upon their disengagement or engagement from forming a conductive path between either of the conductors and an electrically conductive coating on the termination module.

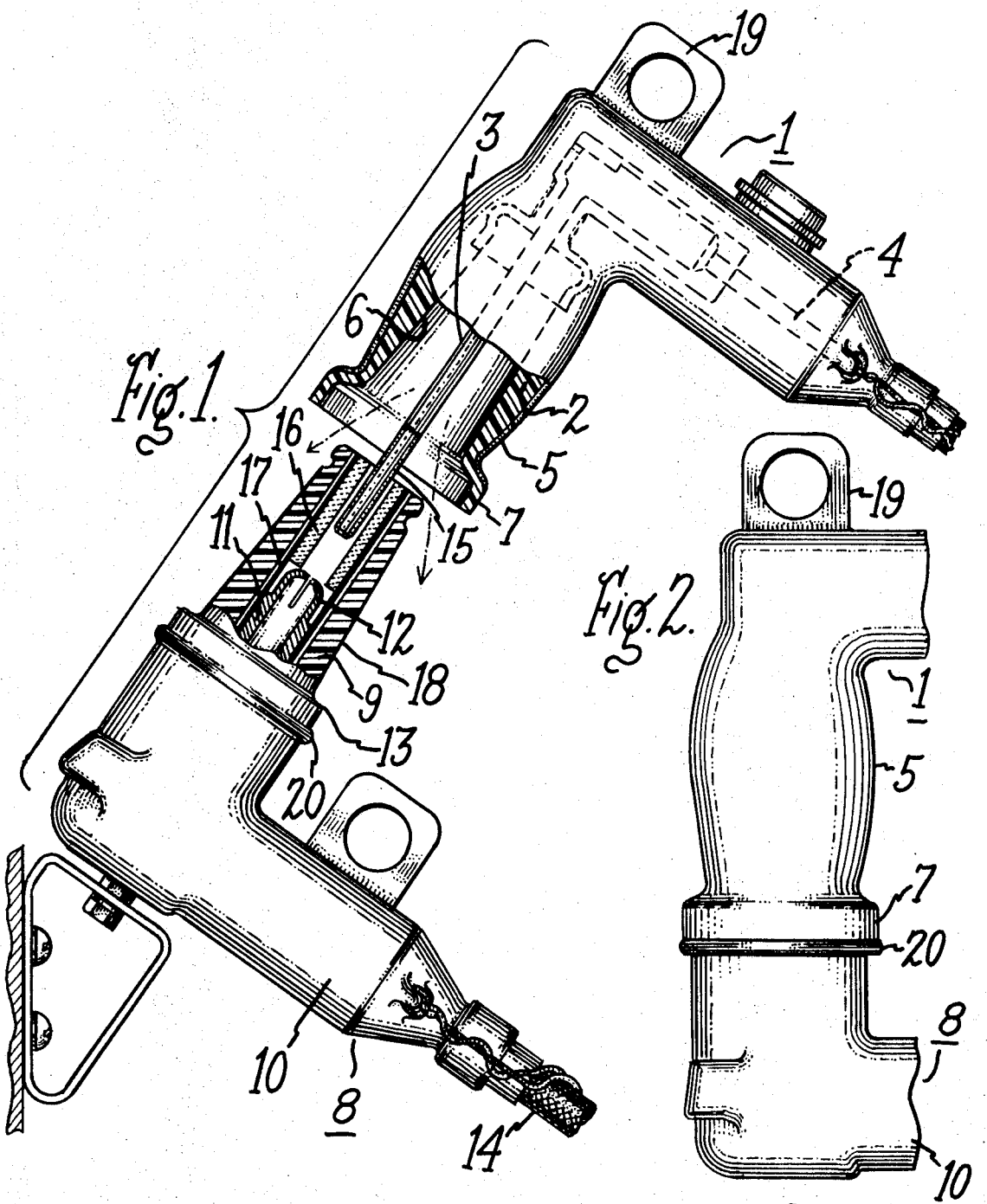

GAS SHIELD FOR LOAD-BREAK CABLE TERMINATION

High voltage electrical conductors such as as those used in power transmission and distribution systems tend to develop corona at points of mechanical discontinuity or irregularity along their length. This problem is particularly acute at cable junctions where a number of surface irregularities and at least one conductor discontinuity are formed. In order to minimize the undesirable resultant radio noise and other objectionable effects of such corona, it is common practice to provide electrical shielding for such systems to minimize the distortion created in the conductor's electrical field by such surface irregularities. For example, on present day underground electrical distribution systems, the conductant cable for such systems is usually wound in an electrically conductive steel shield that serves as a ground plane over the length of the cable. At cable terminations or junctions in such a system, modular cable terminations, formed of an insulating housing having a conductive ground plane mounted thereon, are provided to maintain this shielding function. In use, conductors mounted in such terminations are electrically connected to the cables and the ground coatings on the respective terminations are electrically connected to the cable's steel shield, so that when the termination module is connected to another module the ground planes on the modules form a smooth, continuous conductive circuit around the conductor coupling or junction formed by the modules.

Until recently, it has been standard practice to open underground cable termination junctions only when the power distribution system in which they are connected has been deenergized. However, load-break devices have now been developed for such modules so they may be safely opened under load conditions. Of course, when a pair of cable termination modules are opened or separated under load conditions, an arc is generally formed between the conductors of the respective modules. Prior to the present invention, the formation of such an arc created a dangerous situation that could cause damage to one of the modules. Specifically, when an arc was formed between prior art cable termination modules, hot ionized gases were blasted out of the cable junction into contact with the conductive ground plane coating on one of the terminations, thus, forming an electrically conductive path between one or both of the high voltage conductors in the termination modules and ground potential at the conductive ground plane coating. This conductive path was capable of establishing an arc that could severely burn the termination module housing and make it unfit for further use.

An object of the present invention is to provide an electric cable termination module having improved arc gas confining means that function to obviate the foregoing problem.

Another object of the invention is to provide a cable termination module that is safer to operate and less expensive to produce than prior art termination modules.

A still further object of the invention is to provide a cable termination module with an integral gas-confining shield that directs arc-generated gases in a predetermined direction away from the conductive ground plane coating on the module.

Other objects and advantages of the invention will become apparent from the following description taken in conjunction with the accompanying drawing.

Briefly stated, in one preferred form of the invention an electric cable termination module having a high voltage electrical conductor mounted in a recess of its insulating housing is provided with a conductive ground plane substantially surrounding the housing and the high voltage conductor, and an insulating gas shield is mounted on the housing at the peripheral edge of the recess. The gas shield projects outwardly from the housing between the high voltage conductor mounted in the recess and the electrically conductive ground coating on the module thereby to form a gas confining means that serves to direct hot ionized gases, generated when the high voltage conductor forms an arc, in a direction away from the ground coating on the module.

FIG. 1 of the drawing illustrates a pair of electrical cable termination modules shown in spaced-apart relation in a side elevation view, partly in cross section, to clearly demonstrate the characteristic features of the present invention which is embodied therein.

FIG. 2 of the drawing shows a side elevation view of the modules depicted in FIG. 1 connected together in their normal operating position.

Referring now to FIG. 1 of the drawing, there is shown a voltage-grading cable termination module 1 having an insulating housing 2 in which is mounted a rodlike copper electrical conductor 3 that is adapted to be connected to a high voltage electrical cable 4 (shown in phantom). In order to electrically shield the irregularities and discontinuities of the electrical conductor and cable junction within module 1, substantially the entire outer surface area of module 1, except the flange portion that will be discussed below, is covered by an electrically conductive coating 5, which may be formed of a conductive elastomeric material of any suitable type taken from those well known in the present art. In like manner, the insulating housing 2 of module 1 may be formed of rubber or epoxy or some other suitable insulating material that is well known in the art. In the preferred form of the invention, an elastomeric material is used to form housing 2. It will be understood that the cable 4 forms part of an electrical power distribution system that serves to connect conductor 3 in module 1 to a source of electric power. Thus, when the system is energized, conductor 3 is maintained at a high voltage.

Pursuant to the present invention, an integral annular flange is formed around the outer peripheral edge of a recess 6 in the insulating housing 2 around the end of conductor 3. This flange 7 takes the form of a short cylinder in the preferred form of the invention, as shown in FIG. 1, but it will be understood that other flange configurations may be utilized to afford the gas confining and channeling functions that will be described in greater detail below. At this point, it is important to facilitate an understanding of the invention to note that the outer surface of flange 7 is not covered by the conductive ground coating 5. Therefore, it will be seen that the flange 7 increases the electrical flashover distance between conductor 3 and the ground coating 5, and also that the insulating flange 7 is positioned in a gas-shielding position between these respective conductive members to afford the shielding function that will be discussed below.

In order to fully describe the functions and advantages of my invention, there is also shown in FIG. 1 a second cable termination module 8 that comprises an insulating housing 9 having a conductive ground coating 10 over a major portion of its outer surface. Module 8 houses a second conductor 11 that is provided with a plurality of resilient fingers 12 which are adapted to engage conductor 3 in module 1 when the modules 1 and 8 are moved together and connected in operating position. It will be understood that the conductive ground plane coating 10 on module 8 terminates at ridge 13 thereon, so that when modules 1 and 8 are connected in operating position the conductive coating on ridge 13 is in close proximity to the terminal end of conductive coating 5 on module 1, with only the insulating flange 7 therebetween. Thus, the respective ground plane coatings form a substantially uniform electric field through the insulating material of flange 7 at this junction, with respect to the energized conductors 3 and 11 in modules 1 and 8.

It should be understood that the electric circuit from cable 4 through conductors 3 and 11 is completed back to the abovementioned distribution system by conductor 11 being electrically connected to a second high voltage insulated electric cable 14, which may be connected to a distribution transformer or other system component (not shown). If the cable 14 is connected to a vault-mounted transformer that generates a substantial amount of heat, it may be found to be desirable to use a high temperature resistant cable for cable 14, in the manner discussed more fully in copending U.S. Pat. application Ser. No. 688,832, which was filed Dec. 7, 1967 and is assigned to the assignee of the present invention. In order to appreciate the advantages of the present invention, it should be understood that a cylindrically shaped rod 15 of arc quenching material is mounted on the end of conductor 3 and a cooperating cylinder 16 of arc quenching material is glued to the walls of an insulating cylinder 17 that serves to mount the cylinder 16 in a predetermined position with respect to the housing 9 and conductor 11. In the preferred embodiment of the invention, the arc-quenching materials 15 and 16 can be formed of a gas evolving acrylic material or a suitable resin such as Celcon, which is a trade name for a resin material manufactured and sold by the Celanese Corporation of America.

In the operation of the present invention, when termination module 1 is moved into operating position with respect to termination module 8, as shown in FIG. 2 of the drawing, the inner surface of recess 6 forms a watertight, voltage grading connection with the outer conically shaped surface 18 of module 8, and conductor 3 is in electrical engagement with the fingers 12 of conductor 11. When it is desired to open or disengage this circuit, a hotstick or other suitable handling means is engaged in the holding loop 19 on module 1 and through this means force is applied to the module 1 to pull it away from module 8. As conductor 3 separates from the fingers 12 of conductor 11, an arc is formed between these two conductive members and this arc is squeezed between the arc extinguishing rod 15 and cylinder 16. This confinement of the arc in close proximity to these arc-extinguishing cylinders generates a substantial volume of hot ionized gases which are blown up into recess 6 and then outwardly in the direction shown by the arrows in FIG. 1. Due to the configuration of flange 7 which is provided on module 1 pursuant to the present invention, and due to its operating position on the edge of conically shaped recess 6, these hot ionized gases are forced to move in a direction away from the conductive coating 5 on module 1. Therefore, the gases are prevented from forming a low resistance conductive path between either conductor 3 or conductor 11 and the ground coating 5.

It will be noted that the hot ionized gases are forced to move toward the ground coating 10 on module 8; however, this direction of movement does not introduce an appreciable risk of damage to module 8 because by the time the gases have moved into contact with the coating 10, they have been sufficiently dispersed and cooled by the direction of movement that they have been forced through by flange 7 so that they are de-ionized and do not form a low resistance conductive path between conductor 3 and the coating 10 on module 8. Accordingly, it can be seen that with the protective gas-shielding flange 7 of the present invention, the risk of flashover to ground following a gas-generating, load-break disconnect operation of the modules 1 and 8 is obviated. It will be apparent to those skilled in the art that other shapes of the gas-shielding flange 7 may be utilized in other embodiments of the invention; however, in the preferred embodiment of the invention the generally cylindrically formed walls of flange 7 which substantially parallel the longitudinal axis of conductor 3 and project outwardly from the end of conductor 3 have been found to be particularly suitable for underground distribution systems where the conductor termination modules 1 and 8 are often subjected to appreciable amounts of moisture. In particular, it will be noted that the flange 7 is formed of a resilient elastomeric insulating material in the preferred form of the invention and this flange 7 is adapted to cooperate with a raised rib 20 on the module 8 as shown clearly in FIG. 2 of the drawing, to further enhance the waterproof seal formed between modules 1 and 8 when they are in their respective operating positions.

What I claim and desire to secure by Letters Patent of the United States is:

1. A voltage-grading termination module comprising an insulating housing having an electrical conductor mounted therein to form an electrical circuit through the housing from a first point adjacent one end thereof to a second point adjacent another end thereof, means defining a recess in said housing around the electrical conductor at said one end thereof, an annular flange of insulating material disposed entirely around the outermost peripheral edge of said recess and projecting outwardly and away from the end of said conductor in the recess thereby to form a gas confining shield around said end of the conductor, and a coating of electrically conductive material mounted on the outer surface of said housing to cover substantially the entire area thereof up to but not including the outer surface of said flange, said recess being generally frustoconical in shape with its large diameter end abutting the innermost end of said flange thereby to form a gas confining chamber and shield arrangement that operates to direct arc-generated gas in a direction away from said coating, said end of said conductor being operable to engage and disengage a second electrical conductor and to form a gas-generating arc between itself and said second conductor during such engaging and disengaging operations, said gas confining shield being effective to prevent such arc-generated gas from forming a conductive path between either of said conductors and said coating.

2. A termination module as defined in claim 1 wherein said annular flange comprises an integral part of said insulating housing.

3. A termination module as defined in claim 1 wherein said flange is cylindrical in form and has its central longitudinal axis disposed in substantial alignment with a longitudinal axis of the conductor in said recess.

4. A termination module as defined in claim 1 wherein said insulating housing is formed of resilient material.

5. A termination module as defined in claim 4 wherein said coating comprises an elastomeric material.

6. A termination module as defined in claim 3 wherein substantially the entire cylinder wall area of said flange is disposed outward from the outermost end of the conductor in said recess.

7. A termination module as defined in claim 5 wherein said coating does not occupy more than 90 percent of the surface area of said housing, but does form at least one continuous electrically conductive circuit between the two ends of said housing.

8. A termination module as defined in claim 5 wherein said flange of insulating material is formed of a material having a dielectric constant that enables a uniform electric field to be formed through it from the terminal end of said conductive coating to the terminal end of a second conductive coating disposed adjacent the inner surface of said flange approximately under the terminal end of said coating.